(12) United States Patent
Reeves et al.

(10) Patent No.: US 9,951,980 B2
(45) Date of Patent: Apr. 24, 2018

(54) FILTER DRIER

(71) Applicant: Parker-Hannifin Corporation, Cleveland, OH (US)

(72) Inventors: Christopher Michael Reeves, Saint Charles, MO (US); David Derner, New Haven, MO (US); Matthew Thomas Sutterfield, Signal Mountain, TN (US); Daniel Stoddard, Pacific, MO (US); Carol Marquart, Washington, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 39 days.

(21) Appl. No.: 15/029,119

(22) PCT Filed: Sep. 29, 2014

(86) PCT No.: PCT/US2014/057968
§ 371 (c)(1),
(2) Date: Apr. 13, 2016

(87) PCT Pub. No.: WO2015/060995
PCT Pub. Date: Apr. 30, 2015

(65) Prior Publication Data
US 2016/0245562 A1     Aug. 25, 2016

Related U.S. Application Data

(60) Provisional application No. 61/895,186, filed on Oct. 24, 2013.

(51) Int. Cl.
*F25B 43/00*     (2006.01)
*B01D 53/02*     (2006.01)

(52) U.S. Cl.
CPC ............ *F25B 43/003* (2013.01); *B01D 53/02* (2013.01); *B01D 2253/342* (2013.01); *B01D 2257/80* (2013.01)

(58) Field of Classification Search
CPC .... B01D 53/02; B01D 53/04; B01D 53/0407; B01D 2253/342; B01D 2257/80
(Continued)

(56) References Cited

U.S. PATENT DOCUMENTS

| 2,505,934 A | 5/1950 | Aughey et al. |
| 3,090,490 A | 5/1963 | Yocum |

(Continued)

OTHER PUBLICATIONS

International Search Report and Written Opinion for corresponding Patent Application No. PCT/US2014/057968 dated Apr. 10, 2015.
(Continued)

*Primary Examiner* — Frank Lawrence
(74) *Attorney, Agent, or Firm* — Renner, Otto, Boisselle & Sklar, LLP

(57) ABSTRACT

A spherical filter drier for an HVACR system includes a generally spherical shell and a core that is fixed position relative to the shell. The shell has a first opening and a second opening in fluid communication with one another across the core. The core includes a media that removes contaminants from fluid flowing from the first opening through the core to the second opening. The spherical shell may be a monolithic shell, or formed from a pair of generally hemispherical shells.

20 Claims, 6 Drawing Sheets

(58) Field of Classification Search
USPC ..... 210/282, DIG. 7; 96/108, 134, 137, 147, 96/149; 62/474
See application file for complete search history.

(56) References Cited

U.S. PATENT DOCUMENTS

| | | | | |
|---|---|---|---|---|
| 4,144,171 | A * | 3/1979 | Krause | B01D 39/00 |
| | | | | 210/496 |
| 4,214,883 | A * | 7/1980 | Raseley | B01D 45/08 |
| | | | | 55/426 |
| 4,364,756 | A * | 12/1982 | Clarke | B01D 46/10 |
| | | | | 210/282 |
| 5,183,567 | A * | 2/1993 | Mohn | B01D 63/084 |
| | | | | 210/321.75 |
| 5,440,898 | A | 8/1995 | Starr | |
| 6,293,125 | B1 * | 9/2001 | Cole | F25B 43/003 |
| | | | | 210/446 |
| 6,852,150 | B2 * | 2/2005 | Lacey | B01D 35/02 |
| | | | | 210/DIG. 6 |
| 7,516,983 | B2 * | 4/2009 | Suehiro | B60R 21/2644 |
| | | | | 280/741 |
| 2015/0128806 | A1 * | 5/2015 | Tesner | B01D 53/04 |
| | | | | 96/153 |

OTHER PUBLICATIONS

International Preliminary Report on Patentability for corresponding Patent Application No. PCT/US2014/057968 dated Mar. 30, 2016.

* cited by examiner

FILTER DRIER

RELATED APPLICATION DATA

This application claims priority to U.S. Provisional Application No. 61/895,186 filed on Oct. 24, 2013 which is incorporated herein by reference in its entirety.

TECHNICAL FIELD

The present disclosure relates to contaminant control in a heating, ventilation, air conditioning and refrigeration (HVACR) system.

BACKGROUND

The function of a filter drier in a HVACR system is to remove harmful contaminants, such as moisture, acid, copper oxides, metal chips, wax-like compounds and the like. Over time, elevated levels of such contaminants can jeopardize the system's useful life and adversely affect system performance.

Historically, conventional filter driers have been generally cylindrical in shape, as shown by the filter drier 10 in FIG. 1. Such filter driers typically include a tubular shell 12 that is enclosed by a pair of end caps 14 and 16, each forming a respective joint 18 and 20 and potential leak path through the filter drier. Coupled to the end caps are respective fitting joints 22 and 24 for plumbing the filter drier into a HVACR system. These joints can provide potential leak paths through the filter drier.

SUMMARY

The present disclosure relates to a generally spherical filter drier for contaminant control in a HVACR system. The spherical design can allow for a reduction or minimization of shell wall thickness for a given working pressure as compared to a comparably sized cylindrical filter drier. The filter drier can have a simplified internal core, such as a molded core, which can be the primary and in some embodiments, the only means of particulate filtration in the filter drier.

The spherical filter drier disclosed herein can have significant advantages over conventional filter driers such as the cylindrical filter drier of FIG. 1. The spherical filter drier can have fewer components, which can reduce both assembly time and material costs. For example, in one embodiment the spherical shell, in combination with the core geometry and strength, allow the core (and any other internal components) to be held in place by compression forces imparted on the core by the shell. This can allow for the elimination of a spring typically used in conventional filter driers to hold the internal components in place, which simplifies assembly and improves manufacturing time. Additionally, the compression of the assembly results in a tight fit around the core, thereby providing for more effective contaminant removal by reducing or eliminating the amount of refrigerant that can circumnavigate the core.

The spherical filter drier can withstand internal pressures that are approximately twice that of conventional cylindrical filter driers. This can allow the spherical filter drier to be used in high pressure systems (e.g., systems that use refrigerants that operate at high pressures). For conventional HVACR systems, the spherical drier can withstand the same internal pressures as conventional cylindrical filter driers, but with significantly less material. For example, the spherical filter drier can have a wall thickness that is approximately half that of a cylindrical filter drier having the same maximum diameter while withstanding a comparable internal pressure. This reduction in wall thickness can lead to significant reductions in materials and manufacturing advantages, which can reduce overall cost.

The spherical filter drier can to have a lower material cost and also decreased size and weight as compared to conventional filter driers. Compared to other geometries, a sphere has a low ratio of external surface area to internal volume. A spherical filter drier can therefore contain more desiccant per unit mass of shell material than other geometries.

The compression assembly of the spherical filter drier allows the elimination of non-filtering elements from the filter drier, which can cause unnecessary barriers to fluid flowing through the filter drier and an undesirable pressure drop across the filter drier. For example, the core of the spherical filter drier can be held in place without a spring or other element. Elimination of the spring removes a barrier for flow through the filter drier and also reduces the pressure drop across the filter drier.

Additionally, removal of non-filtering elements from the flow path through the filter drier can allow for optimal sizing of the core and the shell. For example, the core can be shaped to obtain a desired flow rate through the filter drier, pressure drop across the filter drier and contaminant adsorption capacity. The shell size can be reduced according to the desired size of the core. This optimal sizing of the filter drier and core can result in a reduction of the refrigerant holding capacity per desiccant volume of the filter drier, which can allow a system manufacturer to charge the system with less overall refrigerant as compared to conventional filter driers which have other internal, non-filtering components, such as a spring or other components needed for assembly.

In order to eliminate potential leak paths through the shell, the shell can be formed from two generally hemispherical shells that are joined to one another. In such an embodiment, the filter drier can have only a single mechanical joint formed where the two shell halves meet as compared to the multiple joints of a conventional filter drier of the type shown in FIG. 1. In another embodiment, the spherical shell and fittings can be integrally formed from a single piece (e.g., monolithic) of material, providing a unitary body that is free of mechanical joints, thereby eliminating the typical leak paths in a conventional filter drier, such as that shown in FIG. 1.

The filter drier may include one or more fittings that are integrally formed with the shell. For example, the fitting(s) may be integrally formed from the shell. As such, the fitting(s) may be unitary (e.g., formed from the same piece of material as the shell) thereby eliminating joint(s) between the shell and the fitting(s), which are typically formed when the fittings are coupled to the shell by hand or furnace braze.

The filter drier can be fabricated from a material having a clad outer layer, for example, copper clad steel. Such material could eliminate the need for application of a protective coating, which is typically applied to filter driers for purposes of corrosion resistance.

According to one aspect, a generally spherical filter drier includes a shell that contains a core that is in a fixed position relative to the shell. The shell has a first opening forming an inlet and a second opening forming an outlet in fluid communication with one another across the core. The core is comprised of a media that removes contaminants from fluid flowing from the first opening through the core to the second opening. The shell may be monolithic or formed from a pair of generally hemispherical shells.

According to another aspect, a filter drier includes a substantially spherical shell having a first hemispherical shell coupled to a second hemispherical shell. The first hemispherical shell has a first opening and the second hemispherical shell has a second opening. The filter drier also includes a core disposed in a flow path between the first opening and the second opening. The core includes a media for removing contaminants from a fluid flowing along the flow path, and is held in place by compressive force imparted on the core by the shell.

According to another aspect, a filter drier includes a sphere-shaped shell having a first cylindrical projection that is telescopically received in a first fitting body and having an edge portion that is formed over an edge portion of the first fitting body. A core is disposed within the shell that provides removal of contaminants from a fluid flowing through the core. The filter drier may have a second cylindrical projection telescopically received in a second fitting body and having an edge portion that is formed over an edge portion of the second fitting body.

According to another, a filter drier includes a sphere-shaped monolithic shell containing a core that is comprised of a desiccant, for example, a beaded or granular desiccant. A first fitting at one end of the shell provides for the coupling of the shell to a component of an HVACR system, and a second fitting at an opposite end of the shell provides for the coupling the shell to another component of an HVACR system. Inside of the shell is a pair of porous containment elements through which fluid flows. The containment elements retain the core in a fixed position within the shell. One of the containment elements is disposed between the inlet and the core and the other containment element is disposed between the core and the outlet.

Further features of the invention will become apparent from the following detailed description when considered in conjunction with the drawings.

BRIEF DESCRIPTION OF THE DRAWINGS

Embodiments of this invention will now be described in further detail with reference to the accompanying drawings, in which.

DETAILED DESCRIPTION

Figure 1:
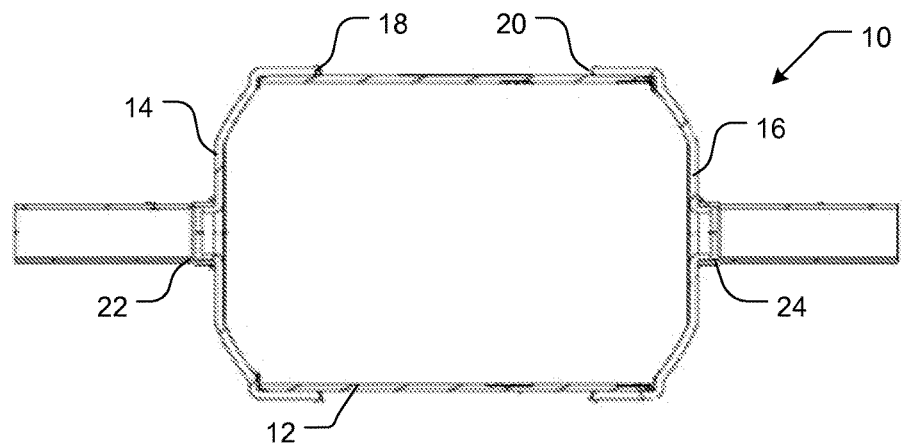
FIG. 1 is a cross-sectional view of a prior art cylindrical filter drier.
Figure 2:
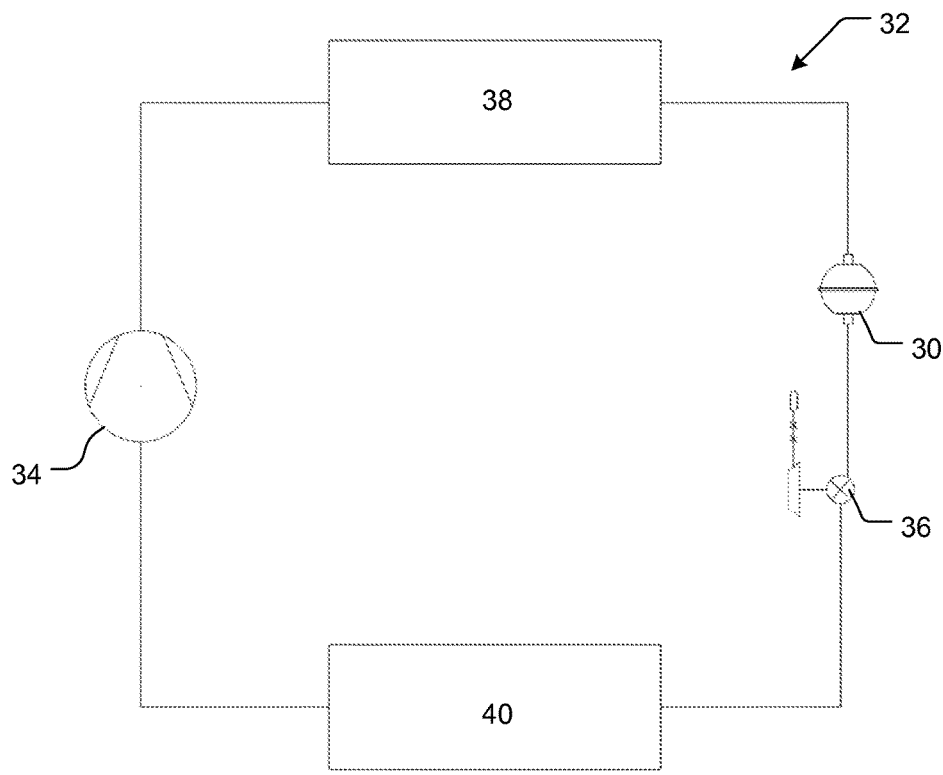
FIG. 2 is a schematic representation of a HVACR system having a spherical filter drier.

FIG. 2 is a schematic representation of a spherical filter drier 30 plumbed as a component in an HVACR system 32 with other HVACR components, for example, a compressor 34, an expansion device 36, a condenser 38, and an evaporator 40 that are plumbed together to form a system. The system is only exemplary, and it should be appreciated that the filter drier can be installed as a component in a variety of HVACR systems that may include the same or different components than those shown in FIG. 2.

Figure 3:
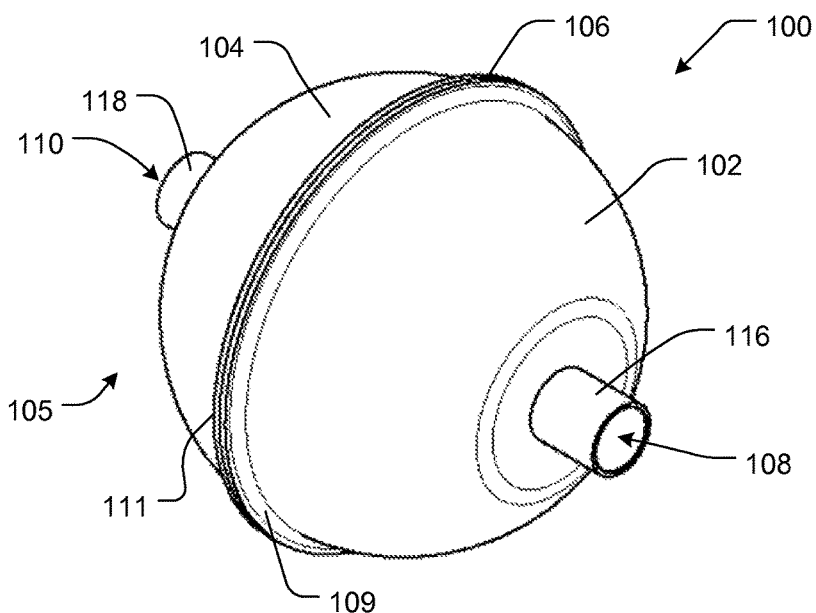
FIG. 3 is an isometric view of an exemplary spherical filter drier.
Figure 4:
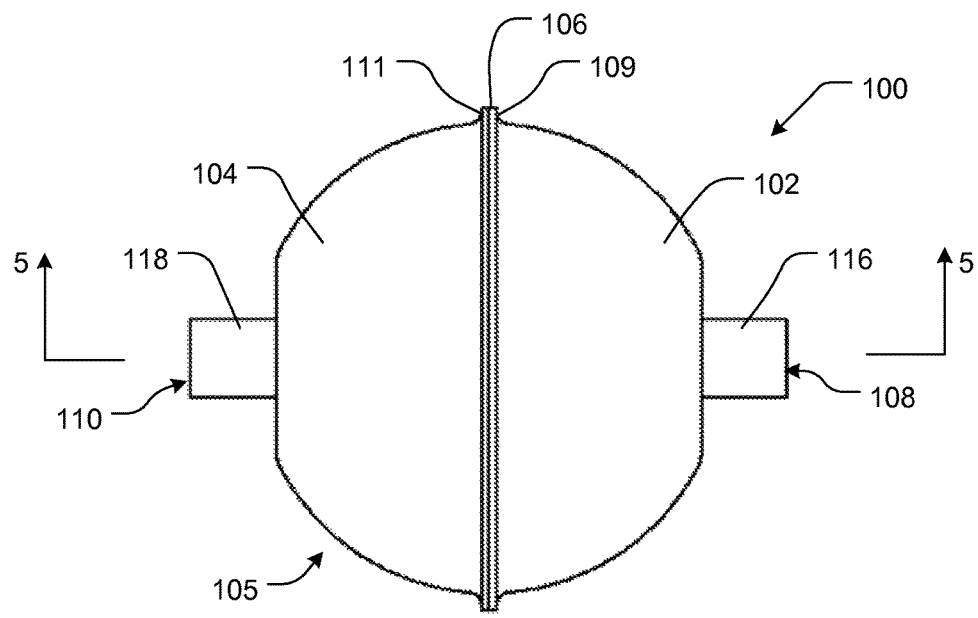
FIG. 4 is a side view of the filter drier shown in FIG. 3.
Figure 5:
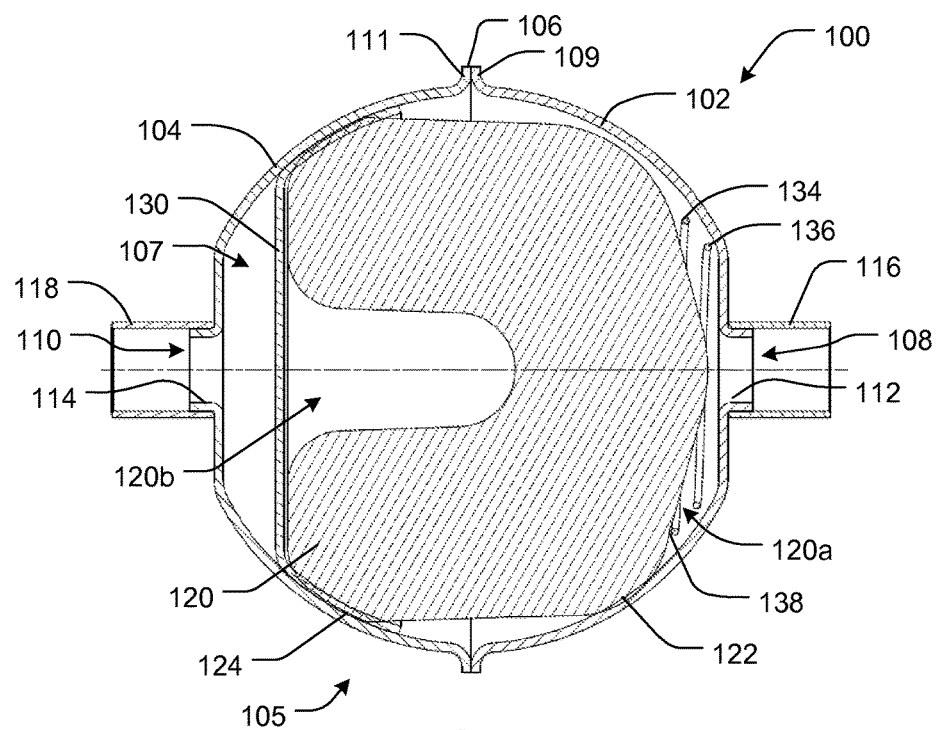
FIG. 5 is a section view of the filter drier of FIG. 4 taken along the lines 5-5 in FIG. 4 and showing a first exemplary internal configuration.

A detailed embodiment of a spherical filter drier 100 is shown in FIGS. 3-5. The filter drier is generally spherical in shape and can be formed from a pair of generally hemispherical shells 102 and 104 coupled to one another at joint a 106 to form a generally spherical shell 105 having a substantially spherical cavity 107. The hemispherical shells can include respective flanged portions 109 and 111, which may be coupled together for example by welding, brazing or another operation at the joint to join the shells together.

The filter drier may be formed from metal. In one embodiment, the shells are formed from a copper clad steel material.

The shell 105 has a first opening 108 and a second opening 110 that are in fluid communication across a core 120 disposed within the cavity 107, thereby forming a flow path through the filter drier. The first opening is an inlet for receiving a flow of fluid and the second opening is an outlet from which the fluid flows after passing though the core.

At the first opening is a first projection 112 that extends axially from the first hemispherical shell. At the second opening is a second projection 114 that extends axially from the second hemispherical shell. The projections may be generally cylindrical in shape and may be integrally formed with the shell. Coupled to the projections are coupling members 116 and 118. The coupling members may be joined to the projections in a generally permanent manner, such as by welding. The coupling members 116 and 118 may be adapted for coupling the filter drier to other components of the HVACR system. For example, the coupling members may be tube stubs, fitting bodies, threaded connections, etc.

The core 120 includes a media for removing contaminants from the fluid. The core may be molded from a porous desiccant material and/or include a beaded or granular desiccant. The core can have a closed end 120a proximal to the inlet and a cavity 120b having an open end proximal to the outlet. As shown in FIG. 5, the core is can be generally U-shaped. This shape can promote dispersion of the fluid throughout the core. The size and shape of the core can be varied to maximize the usage of the internal volume of the shell. The geometry of cavity 120b can be modified to achieve a desired balance of refrigerant flow, soluble contaminant adsorption, and particulate contaminant filtration. For example, the contaminant adsorption capacity of the core can be increased by making the core larger, resulting in a smaller (or narrower) core cavity, a decreased flow rate through the filter drier, and an increased pressure drop across the filter drier. Alternatively, the flow rate through the filter drier can be increased and pressure drop across the filter drier can be decreased by making the core smaller, resulting in a larger (or wider) core cavity, and a lower contaminant adsorption capacity due to the reduced size of the core.

Figure 6:
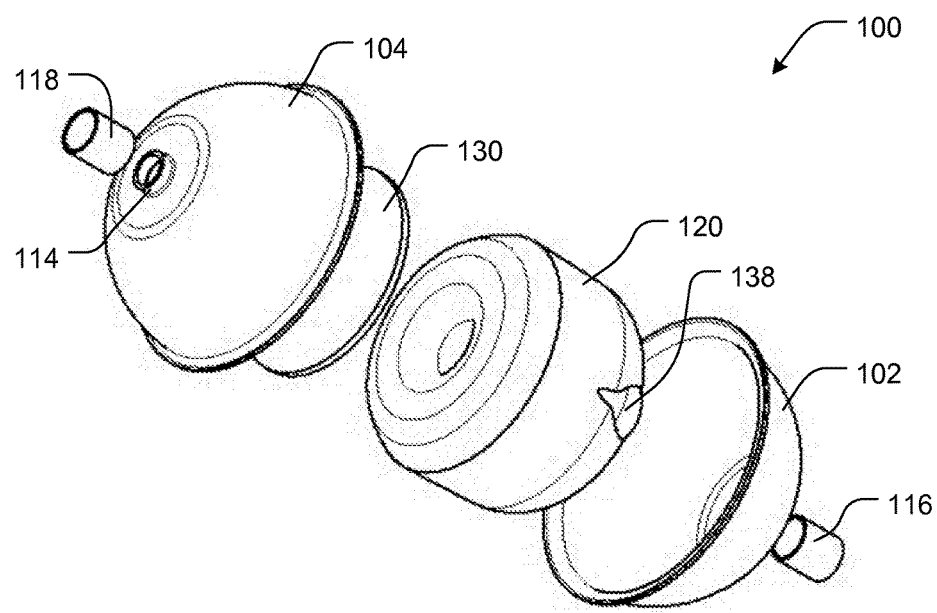
FIG. 6 is an exploded isometric view of the spherical filter drier of FIG. 4.

The core is in a generally fixed position relative to the shell. In the embodiment of FIG. 5, the core 120 includes surfaces 122 and 124 that abut respective internal portions of the hemispherical shells 102 and 104. The core may be sized and shaped to be slightly larger than the cavity such that when assembled, the hemispherical shells press against the core, thereby holding the core tightly in place relative to the shell. Additionally or alternatively, as shown in FIG. 6, the core may include one or more projections 138 against which the shell presses, thereby fixing the position of the core relative to the shell.

In order to prevent fluid from bypassing or circumnavigating the core by flowing along the walls of the shell around the core instead of through the core, the filter drier may include a fluid barrier between the core and the shell. The fluid barrier may be in the form of an adhesive applied at surface(s) 122 and/or 124. The adhesive forms a seal between the core and the shell that prevents fluid flowing from flowing around the core thereby ensuring that the fluid passes through the core. Additionally, or alternatively, the fluid barrier may be formed by deforming (e.g., crimping or inwardly deflecting) the shell against the core to seal the shell against the core and fix the position of the core relative to the shell. For example, the shell may be crimped or deflected against the core at surface 124.

The filter drier may include a filter 130 between the core 120 and the first opening 110. A portion of the filter may be squeezed between surface 124 of the core and the shell 104, and held in place when the shell is assembled around the core. The filter may provide for the filtering of small scale or microscopic contaminants from the fluid while the core 120 may provide for the filtering of large scale or macroscopic contaminants.

Optionally, the filter drier also may include a biasing member 134, for example a spring, for applying a biasing force against the core. The biasing member can engage an internal surface 136 of the shell adjacent the first opening 108 and a surface 138 of the core facing the first opening. The biasing member compresses the core against a portion of the shell adjacent the second opening (e.g., surface 124) to keep the core and any filter element closely packed together, which may facilitate assembly of the filter drier.

Figure 7:
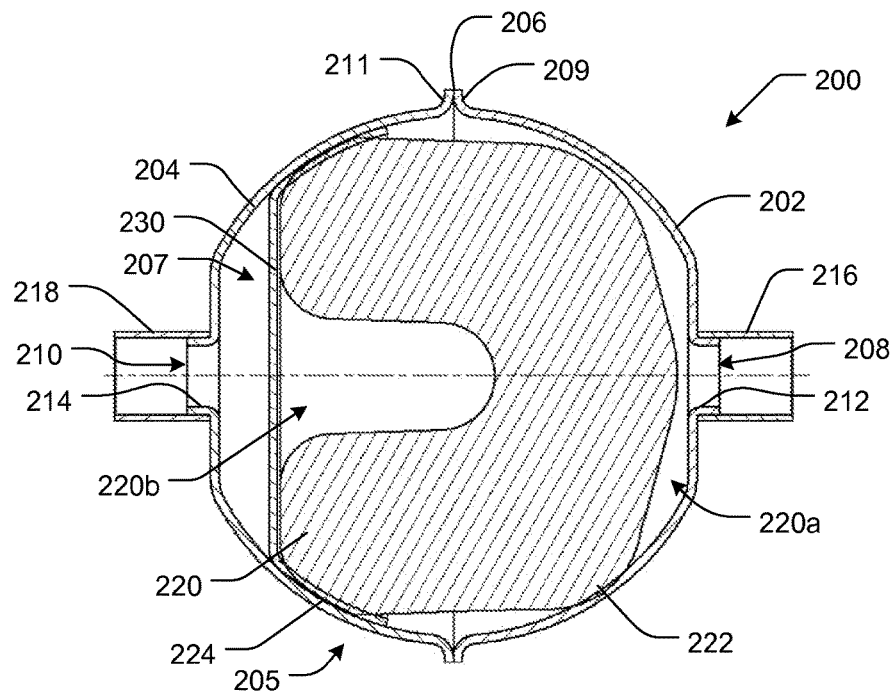
FIG. 7 is a cross-sectional view of another embodiment of a filter drier showing another exemplary internal configuration.

Another interior configuration of a spherical filter drier 200 is shown in FIG. 7. The filter drier 200 of FIG. 7 is similar to the embodiment shown and described with respect to FIG. 5 with like parts bearing similar reference numerals indexed by 100. In this embodiment, the core is held in place by compression forces from the shell without a biasing member. The filter drier may include a filter 230 for filtering of small scale or microscopic contaminants from the fluid, and the core may provide for the filtering of large scale or macroscopic contaminants. Alternatively, the filter 230 may be omitted from the filter drier and the core may filter both macroscopic and microscopic contaminants. As shown in FIG. 7, if a filter 230 is employed, it can be wrapped around the outlet end of the core 220 and sandwiched between the core 220 and the shell 204, thereby providing a fluid barrier than forces the fluid to flow through the core.

Figure 8:
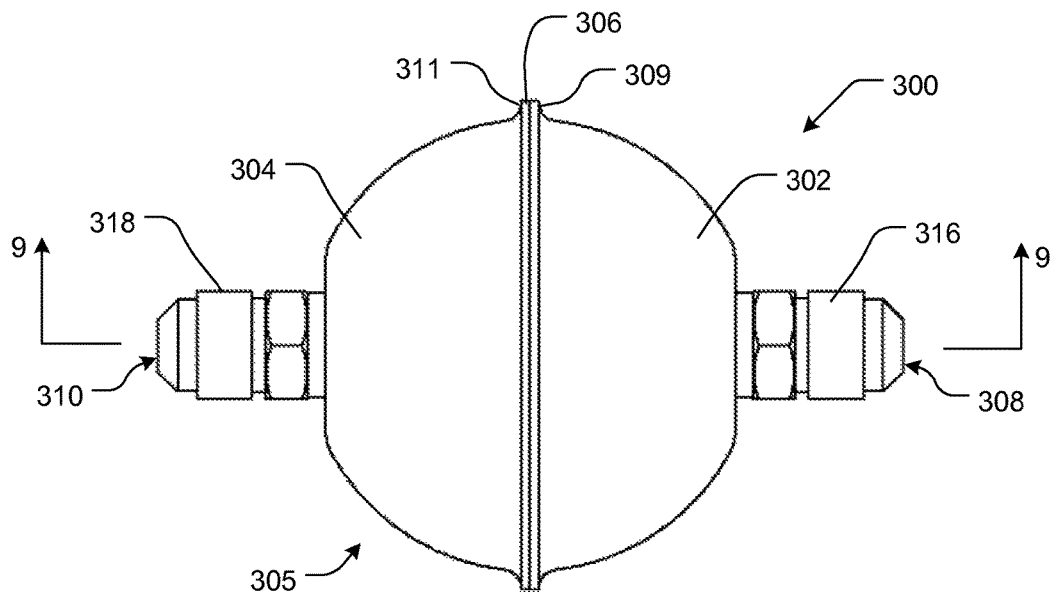
FIG. 8 is a side view of another exemplary embodiment of a spherical filter drier.
Figure 9:
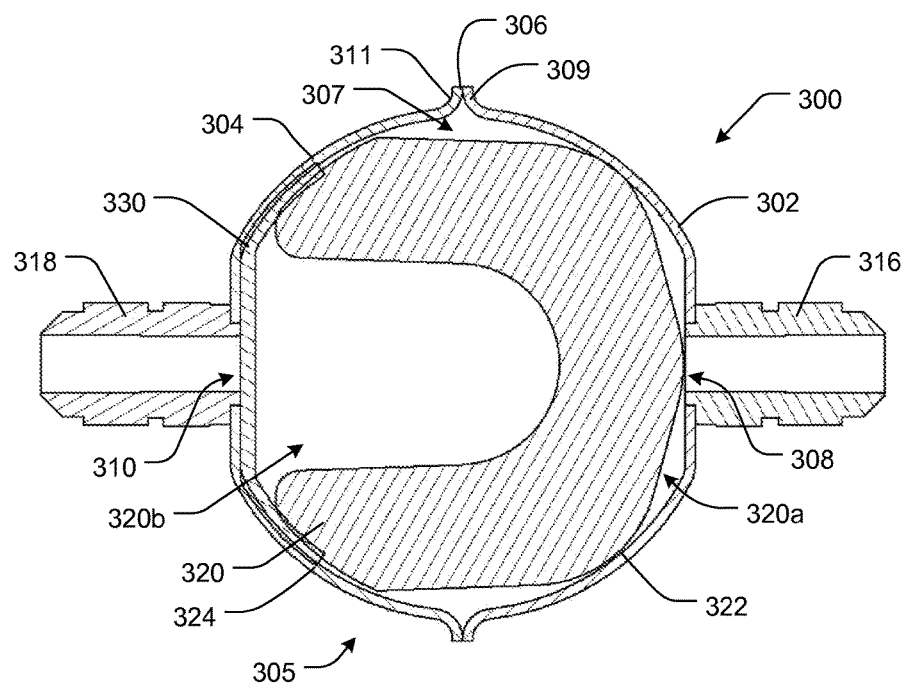
FIG. 9 is a cross-sectional view of the filter drier of FIG. 8 taken along the lines 9-9 and showing another exemplary internal configuration.

FIGS. 8 and 9 show another embodiment of a filter drier 300. The filter drier 300 is similar to the embodiment shown and described with respect to FIG. 5 with like parts bearing similar reference numerals indexed by 200. Rather than having projections (e.g., projections 212 and 214) as shown in FIG. 5, the filter drier of this embodiment includes a pair of fittings 316 and 318 that are coupled directly to the spherical shell 305. The fittings can be coupled to the shell by a threaded connection, brazing, welding, or another operation. The fittings can be standard fittings to facilitate the plumbing of the filter drier into a HVACR system, and in one embodiment are SAE-type fittings.

Figure 10:
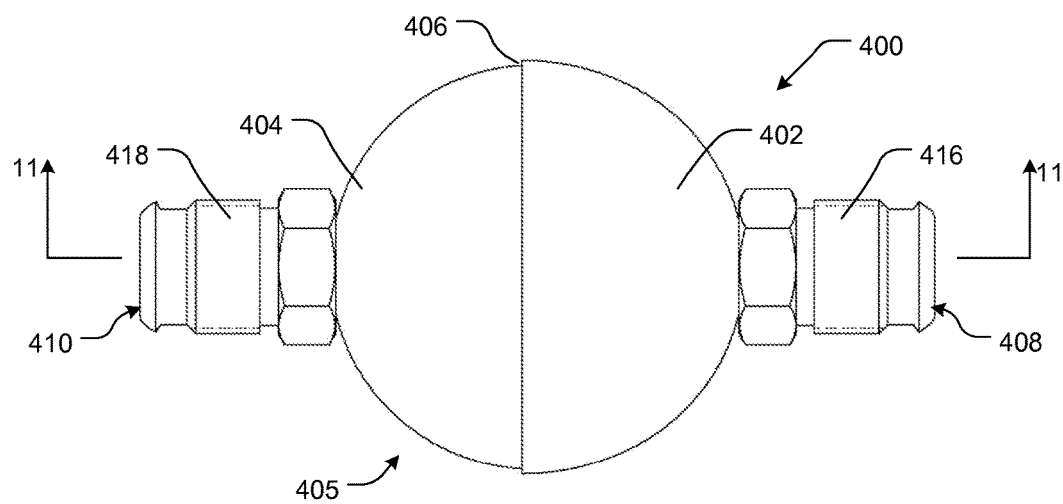
FIG. 10 is an isometric view of another exemplary embodiment of a spherical filter drier.

Another embodiment of a spherical filter drier 400 is shown in FIG. 10. The filter drier 400 is formed from a pair of hemispherical shells 402 and 404 that are coupled at joint 406 to form a generally spherical shell 405. In this embodiment, the joint 406 is a lap joint formed by joining an overlapping a portion of shells 302 and 304. For example, the hemispherical shells may be formed such that one shell half (e.g., hemispherical shell 404) has a slightly smaller diameter than the other shell half (e.g., hemispherical shell 402), which allows a portion of the one shell to be inserted into the other shell such that the joint 406 is formed by the overlapping portions of the shells. The joint can be formed by brazing or welding the overlapping portions of the shells to one another.

The filter drier 400 includes flared couplings 416 and 418 for coupling the filter drier to other components of a HVACR system. An exemplary flared coupling 416 is shown in detail in FIG. 11. The hemispherical shell 402 includes a cylindrical projection 414 that is integrally formed with the shell. The projection 414 has an outer surface 430 that is configured to receive a fitting body 432. The projection 414 and the fitting body 432 may be tubular and shaped such that the fitting body 432 can be telescoped over the projection 414 to assemble the fitting to the filter drier. The fitting body has an internal diameter that is slightly larger than the diameter of the outer surface of the projection such that the fitting body is closely fit to the projection. The fitting body may abut a surface of the hemispherical shell, and in such position, a distal end 434 of the projection can extend beyond a distal end 436 of the fitting body. The distal end 434 of the projection is wrapped over the distal end 436 of the fitting body to form a flared end 438. The flared end traps the fitting body between the edge of the projection and the shell and also provides a seating surface for mating with a fitting of another component of a HVACR system. The interior of the shell and the flared end are therefore connected with one another and formed from a continuous segment of the shell, thereby eliminating any potential leak paths that may result from attaching a fitting to the shell.

The flare may be compressed when the fitting body is assembled to a corresponding portion of a fitting, e.g., when a threaded connection is formed. The assembly forms a metal-to-metal interface which can be an effective seal against leaks when the filter drier is coupled to another component of a HVACR system. Although described with respect to connection 416, it should be appreciated that connection 418 may be formed in the same manner.

Figure 12:
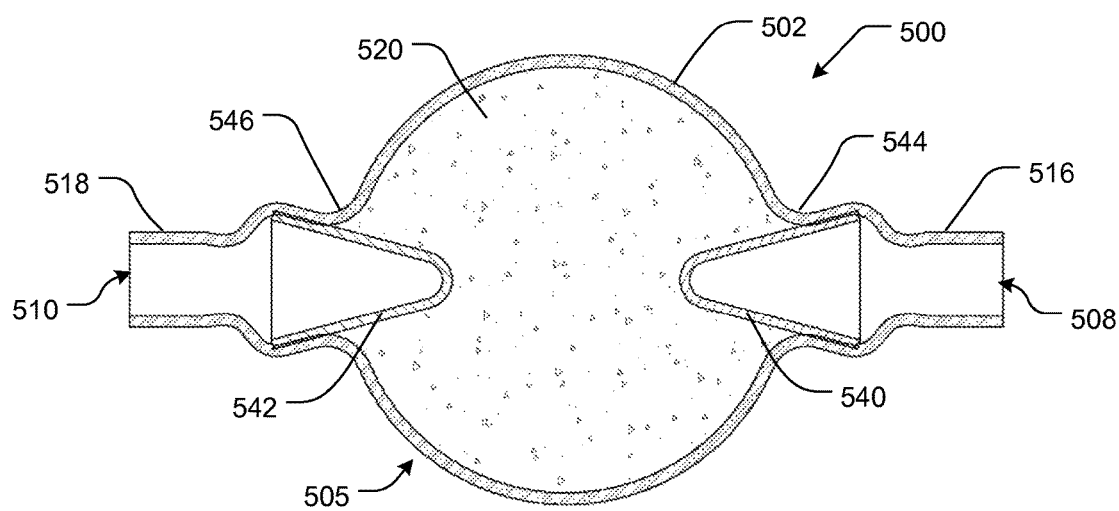
FIG. 12 is a cross-sectional view of an exemplary embodiment of a spherical filter drier having a monolithic shell.

Another embodiment of a filter drier 500 is shown in FIG. 12. The filter drier includes a monolithic shell 502 (e.g., formed from a single piece of material), and may be fabricated from a mold or a single piece of formed tubing. The filter drier includes a spherical portion 505 that contains a core 520 comprised of a desiccant. The core may be formed from a beaded or granular desiccant that is held relative to the shell by a pair of containment elements 540 and 542. The containment elements may be spring-like elements that engage respective mechanical deformations 544 and 546 (e.g., notches, indentations, or grooves) in the shell. The containment elements may be porous elements and may provide for filtering of the fluid flowing through the filter drier.

Figure 11:
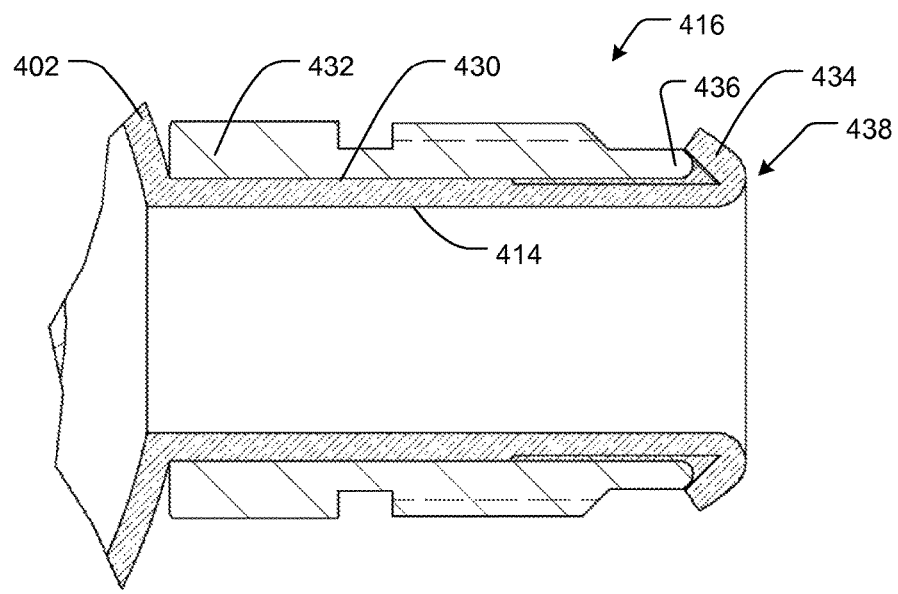
FIG. 11 is a cross-sectional view of a fitting end of the filter drier of FIG. 10.

The filter drier has a first fitting end 516 at one end of the shell that provides for the coupling of the shell to a component of an HVACR system, and a second fitting end 518 at an opposite end of the shell that provides for the coupling the shell to another component of an HVACR system. Fitting 516 and/or fitting 518 may be flared fittings as shown in FIG. 11 or other type of fitting.

The filter drier shown in FIG. 12 completely eliminates joints in the filter drier and is suited for an assembly process that can be automated. By eliminating the core molding process and directly injecting the beads into the shell, additional labor and material expenses can be avoided.

To the accomplishment of the foregoing and related ends, the invention comprises the features fully described herein and particularly pointed out in the claims. The description and the annexed drawings set forth in detail certain illustrative embodiments of the invention. These embodiments are indicative, however, of but a few of the various ways in which the principles of the invention may be employed. Other objects, advantages and novel features of the invention will become apparent from the detailed description of the invention when considered in conjunction with the drawings.

The invention claimed is:

1. A filter drier for a HVACR system comprising:
   a shell which is the shape of a sphere,
   a core which is contained with the shell in a fixed position relative to the shell,
   in which the shell has a first opening comprising an inlet and a second opening comprising an outlet, the inlet and outlet in fluid communication with one another across the core, and in which the core comprises a media that removes contaminants from fluid flowing from the first opening through the core to the second opening.

2. The filter drier of claim 1, in which the shell comprises a pair of generally hemispherical sections joined to one another.

3. The filter drier of claim 1, in which the shell is monolithic.

4. The filter drier of claim 1, in which the media comprises a desiccant.

5. The filter drier of claim 4, in which the core is a molded core.

6. The filter drier of claim 5, in which the core is a beaded desiccant or a porous desiccant.

7. The filter drier of claim 1, further comprising a fluid barrier between the shell and the core, wherein the fluid barrier forms a seal that prevents fluid from circumnavigating the core.

8. The filter drier of claim 1, further comprising a filter for filtering fluid that passes through the core, the filter disposed between the core and the second opening.

9. The filter drier of claim 1, further comprising a biasing member between the shell and a portion of the core facing the first opening, the biasing member compressing the core against a portion of the shell adjacent the second opening.

10. The filter drier of claim 1, further comprising a first projection extending from the first opening and having an edge that is wrapped around an edge of a fitting to provide a flared fitting connection.

11. The filter drier of claim 1, in which the shell comprises steel that is laminated on at least one side with a layer of copper.

12. A filter drier for a fluid comprising:
    a shell which is the shape of a sphere and which comprises a first shell coupled to a second shell, the first shell having a first opening and the second shell having a second opening;
    a core disposed within the shell in a flow path between the first opening and the second opening, the core comprising a media for removing contaminants from a fluid flowing along the flow path, the core being compressed by the first shell and the second shell.

13. The filter drier of claim 12, further comprising a first fitting coupled to the first shell at the first opening, the first fitting being configured for coupling the filter drier to a component of a HVACR system, and a second fitting coupled to the second shell at the second opening, the second fitting being configured for coupling to a component of a HVACR system.

14. The filter drier of claim 12, wherein the core is a molded porous or beaded desiccant.

15. The filter drier of claim 12, further comprising a fluid barrier between the shell and the core that prevents fluid flowing through the filter drier from circumnavigating the core.

16. The filter drier of claim 7, wherein the seal is comprised of an adhesive.

17. The filter drier of claim 12, further comprising a biasing member between the shell and a portion of the core facing the first opening, the biasing member compressing the core against a portion of the shell adjacent the second opening.

18. A filter drier comprising:
    a shell which in the shape of a sphere and which has a first cylindrical projection having an edge portion, and a second cylindrical projection which has an edge portion, and
    a first fitting body in which the first cylindrical projection is received with the edge portion of the first cylindrical projection formed over an edge portion of the first fitting body,
    a second fitting body in which the second cylindrical projection is received with the edge portion of the second cylindrical projection formed over an edge portion of the second fitting body,
    a core disposed within the shell that provides removal of contaminants from a fluid flowing through the core.

19. A filter drier comprising:
    a monolithic shell which is in the shape of a sphere and which contains a core comprised of a desiccant;
    a first fitting at one end of the shell for coupling the shell to a component of an HVACR system, and a second fitting at an opposite end of the shell for coupling the shell to another component of an HVACR system; and
    a pair of respective containment elements through which fluid flows, the containment elements disposed within the shell and containing the core in a fixed position therein, in which one of the containment elements is disposed between the inlet and the core and the other containment element is disposed between the core and the outlet.

20. The filter drier of claim 8, wherein the filter has an annular peripheral portion sandwiched between the core and the shell.

* * * * *